US009798070B2

(12) United States Patent
Van Bommel et al.

(10) Patent No.: US 9,798,070 B2
(45) Date of Patent: Oct. 24, 2017

(54) LIGHT EMITTING DEVICE

(71) Applicant: PHILIPS LIGHTING HOLDING B.V., Eindhoven (NL)

(72) Inventors: Ties Van Bommel, Horst (NL); Rifat Ata Mustafa Hikmet, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/031,322

(22) PCT Filed: Oct. 23, 2014

(86) PCT No.: PCT/EP2014/072721
§ 371 (c)(1),
(2) Date: Apr. 22, 2016

(87) PCT Pub. No.: WO2015/067476
PCT Pub. Date: May 14, 2015

(65) Prior Publication Data
US 2016/0259116 A1    Sep. 8, 2016

(30) Foreign Application Priority Data

Nov. 5, 2013    (EP) .................................... 13191497

(51) Int. Cl.
*F21V 8/00* (2006.01)
*F21S 8/10* (2006.01)
(Continued)

(52) U.S. Cl.
CPC .......... *G02B 6/0055* (2013.01); *F21S 48/115* (2013.01); *F21S 48/1145* (2013.01);
(Continued)

(58) Field of Classification Search
CPC . B60Q 1/0011; F21K 9/00; F21K 9/61; F21K 9/64; F21S 48/115; F21S 48/1241;
(Continued)

(56) References Cited

U.S. PATENT DOCUMENTS 3,772,506 A  *  11/1973  Junginger ............. F21V 7/0008
                                                    359/833
5,134,550 A  *   7/1992  Young ..................... F21S 8/088
                                                    362/298

(Continued)

FOREIGN PATENT DOCUMENTS

EP      1418381 A2     12/2004
EP    2500765A1 A1      9/2012
(Continued)

*Primary Examiner* — Hargobind S Sawhney

(57) ABSTRACT

In various embodiments, a light emitting device is provided comprising a plurality of first solid state light sources for emitting first light with a first spectral distribution, and a first light guide comprising a first light input surface, a first end surface extending in an angle with respect to each other and at least one first further surface extending parallel to the first light input surface. The first light guide receiving the first light at the first light input surface, and guiding a part of the first light to the first end surface. The light emitting device further comprises one first optical element, for shaping light that is coupled out of the first light guide through a part of the at least one first further surface such as to provide a first shaped light, and at least one second optical element on the first end surface.

14 Claims, 6 Drawing Sheets

(51) Int. Cl.
*F21V 9/16* (2006.01)
*F21W 121/00* (2006.01)
*F21Y 105/00* (2016.01)
*F21V 29/505* (2015.01)

(52) U.S. Cl.
CPC ....... *F21S 48/1159* (2013.01); *F21S 48/1225* (2013.01); *F21S 48/1241* (2013.01); *F21S 48/1323* (2013.01); *F21S 48/1335* (2013.01); *G02B 6/0003* (2013.01); *G02B 6/0063* (2013.01); *G02B 6/0076* (2013.01); *G02B 6/0085* (2013.01); *F21S 48/328* (2013.01); *F21V 9/16* (2013.01); *F21V 29/505* (2015.01); *F21W 2121/00* (2013.01); *F21Y 2105/00* (2013.01)

(58) Field of Classification Search
CPC .............. F21S 48/1323; F21S 48/1329; F21S 48/1388; F21S 48/236; F21V 14/04; F21V 7/0091; F21Y 2101/00; G02B 6/002; G02B 6/0063
See application file for complete search history.

(56) References Cited

U.S. PATENT DOCUMENTS

| | | | | |
|---|---|---|---|---|
| 5,278,731 A * | 1/1994 | Davenport | ........... | B60Q 1/0011 362/258 |
| 5,581,683 A * | 12/1996 | Bertignoll | ........... | G02B 6/0003 362/558 |
| 6,796,698 B2 * | 9/2004 | Sommers | ........... | F21V 7/041 340/815.45 |
| 7,275,849 B2 * | 10/2007 | Chinniah | ........... | F21K 9/00 362/296.07 |
| 8,128,267 B2 * | 3/2012 | Sormani | ........... | F21K 9/00 362/553 |
| 8,727,574 B2 * | 5/2014 | Simchak | ........... | F21V 7/07 362/296.07 |
| 8,807,799 B2 * | 8/2014 | Li | ........... | F21V 7/0008 362/231 |
| 8,998,478 B2 * | 4/2015 | McCollum | ........... | F21S 8/06 362/147 |
| 9,028,120 B2 * | 5/2015 | Dau | ........... | F21S 8/04 362/555 |
| 9,412,926 B2 * | 8/2016 | Keller | ........... | H01L 33/641 |
| 2006/0022210 A1 | 2/2006 | Streubel | | |
| 2007/0145397 A1 * | 6/2007 | DenBaars | ........... | H01L 33/20 257/98 |
| 2007/0152230 A1 | 7/2007 | Duong et al. | | |
| 2007/0279908 A1 * | 12/2007 | Alcelik | ........... | F21S 8/08 362/283 |
| 2008/0198603 A1 * | 8/2008 | Sormani | ........... | F21K 9/00 362/259 |
| 2009/0201679 A1 * | 8/2009 | Konaka | ........... | F21K 9/00 362/235 |
| 2011/0044022 A1 | 2/2011 | Ko et al. | | |
| 2012/0140461 A1 | 6/2012 | Pickard | | |
| 2012/0268966 A1 * | 10/2012 | McCollum | ........... | F21S 8/06 362/607 |

FOREIGN PATENT DOCUMENTS

| | | |
|---|---|---|
| WO | 2005027576 A2 | 3/2005 |
| WO | WO2006054199 A1 | 5/2006 |
| WO | 2009066207 A1 | 5/2009 |
| WO | 2011107908 A1 | 9/2011 |
| WO | 2012056382 A1 | 5/2012 |
| WO | 2013001402 A2 | 1/2013 |

* cited by examiner

LIGHT EMITTING DEVICE

CROSS-REFERENCE TO PRIOR APPLICATIONS

This application is the U.S. National Phase application under 35 U.S.C. §371 of International Application No. PCT/EP2014/072721, filed on Oct. 23, 2014, which claims the benefit of European Patent Application No. 13191497.0, filed on Nov. 5, 2013. These applications are hereby incorporated by reference herein.

FIELD OF THE INVENTION

The invention relates to a light emitting device having a plurality of light sources and a light guide. The invention further relates to a lamp, a luminaire or a lighting system comprising such a light emitting device.

BACKGROUND OF THE INVENTION

High intensity light sources, and particularly white high intensity light sources, are interesting for various applications including spots, stage-lighting, automotive lighting and digital light projection. For such purposes, as well as for obtaining a desired light shape, light distribution and color distribution with a point of high intensity, it is possible to make use of so-called light concentrators where short wavelength light is converted to longer wavelengths in a highly transparent luminescent material. Such a transparent luminescent material is illuminated by LEDs to produce longer wavelengths within the luminescent material. Converted light, which will be waveguided in the luminescent material, is extracted from a surface leading to a point of high brightness.

Document WO 2012/056382 A1 describes in one embodiment a light emitting device comprising a waveguide, a light source and a plurality of light outcoupling structures. The waveguide may be provided with a luminescent material arranged on or in the waveguide and may thereby be configured to convert light from a light source into luminescent material emission.

However, in various lighting applications such as automotive lighting a complicated light shape, light distribution and color distribution is needed. For instance, when illuminating a road it is necessary to have a light beam which must have a particular shape and also have a particular intensity distribution. Furthermore, there are applications, such as headlamps, where more complicated angular light color distribution is needed for comfort and safety. For example, for automotive lamps, it may be desired that in the straight forward direction light is white for good visibility, in the left (or right) direction more yellowish light may be preferred to avoid the blinding of oncoming drivers and in the right (or left) direction more bluish light may be preferred in order to enhance the visibility of the road marks. This is very difficult to obtain in a simple way by using known light emitting devices, particularly when employing LEDs.

SUMMARY OF THE INVENTION

It is an object of the present invention to overcome this problem, and to provide a light emitting device with which light beams with a desired light shape, light distribution and color distribution may be obtained in a simple and cost effective manner even for light emitting devices used in applications requiring relatively complex light distributions.

According to a first aspect of the invention, this and other objects are achieved by means of a light emitting device comprising a plurality of first solid state light sources adapted for, in operation, emitting first light with a first spectral distribution, and a first light guide comprising a first light input surface, a first end surface extending in an angle different from zero with respect to each other and at least one first further surface extending parallel to the first light input surface, the plurality of first solid state light sources being arranged at the first light input surface, the first light guide being adapted for receiving the first light with the first spectral distribution at the first light input surface, and guiding at least a part of the first light with the first spectral distribution to the first end surface, the light emitting device further comprising at least one first optical element, which is adapted for shaping light that is coupled out of the first light guide through at least a part of the at least one first further surface such as to provide a first shaped light, and at least one second optical element arranged at or on the first end surface.

By providing a light guide being adapted for receiving light emitted by a plurality of solid state light sources, a light guide is provided with which a particularly large amount of the light will stay in the light guide and which can be extracted from one of the surfaces, which in turn leads to a particularly high intensity gain.

By providing a light emitting device with a light guide having a light input surface and an end surface extending in an angle different from zero to each other, and in embodiments extending perpendicular to each other, the area of the light input surface and the area of the light exit surface can be selected to obtain a light emitting device with which more light is coupled into the light guide and with which an optimally large amount of light is guided towards the respective end surface by means of total internal reflection (TIR).

By providing at least one first optical element being adapted for shaping light coupled out of the first light guide through at least a part of the at least one first further surface such as to provide a first shaped light, it becomes possible to collect and utilize the light coupled out of the first further surfaces in order to obtain a light beam with a desired light shape, light distribution and color distribution.

By providing at least one second optical element arranged at or on the first end surface, a light emitting device is provided with which the light guided to and arriving at the first end surface can be optically processed by the second optical element separate from the light that is coupled out of the first light guide through at least a part of the at least one first further surface.

In an embodiment the plurality of solid state sources are arranged both on the first light input surface and on a first further surface opposite to the first light input surface and the first light guide is adapted for receiving the first light with the first spectral distribution at the first light input surface and at the first further surface opposite to the first light input surface.

In an embodiment the first light guide is adapted to couple at least a part of the first light with the first spectral distribution out of the first end surface and the at least one second optical element is adapted for shaping the first light with the first spectral distribution coupled out of the first light guide through the first end surface such as to provide a second shaped light. Thereby a light emitting device is provided in which the light coupled out of the light exit surface is also shaped, separately from and in addition to shaping of the light that is coupled out at least a part of the at least one first further surface. The two light beams, i.e. the first shaped light and the second shaped light, in combination form a common light output beam of the light emitting device. Thereby a light emitting device may be obtained in a simple and cost effective manner with which a light output with a desired light shape, light distribution and color distribution even of a relatively complex nature.

In an embodiment the at least one second optical element furthermore is adapted for shaping at least a part of the first shaped light shaped by the first optical element. Thereby a light emitting device is provided with which the first shaped light may be further shaped. In this way another parameter usable in achieving a light output with a desired shape and light distribution is obtained in a simple and cost effective manner, thus adding to the obtainable complexity of the light output.

In an embodiment the at least one first optical element is adapted for converting at least a part of the first shaped light to light with a third spectral distribution and wherein the second optical element is adapted for converting at least a part of the second shaped light to light with a fourth spectral distribution being different from the third spectral distribution. Thereby a light emitting device is provided with which the light coupled out of the first light guide may be provided with even more complex color distributions.

In an embodiment the light emitting device further comprises at least one third optical element arranged and adapted for shaping one or more of at least a part of the first shaped light shaped by the first optical element and at least a part of the second shaped light shaped by the second optical element. Thereby a light emitting device is provided with which a part or all of the first shaped light and/or the second shaped light is shaped further. Thus, another parameter usable in achieving a light beam with a desired shape and light distribution is obtained in a very simple manner, thus adding to the obtainable complexity of the light output.

The at least one first optical element may be chosen from the group comprising a reflector, a parabolic reflector, an optical element with total internal reflection, a compound concentrator, a compound parabolic concentrator, a lens, a lens array, a diffractive element and a refractive element. Likewise, the at least one second and third optical element may be chosen from the very same group of optical elements.

In an embodiment the at least one second optical element is a reflector and wherein the first light guide is adapted to couple at least a part of the first light with the first spectral distribution out of at least a part of the at least one first further surface. The reflector thus results in that no light is coupled out of the first end surface of the first light guide, but the light in the first light guide guided to and arriving at the first end surface is reflected back into the first light guide and at least a part of the light in the first light guide is coupled out at a part of at least one further surface. This out-coupled and emitted light is then shaped by the first optical means to provide for the first shaped light. By coupling light out only at a part of the at least one further surface a high brightness first shaped light is obtained through the use of the first and second optical element.

In an embodiment light out-coupling means are provided on the at least part of the at least one first further surface of the first light guide. In another embodiment light out-coupling means are provided in a part or region of the first light guide. In this way the out-coupling of light from the at least part of the at least one first further surface is achieved at a predetermined position on or in the first light guide in an efficient way. For example, a roughened surface, a scattering layer, a refractive layer or a phosphor layer may be provided on the at least part of the at least one first further surface, or scattering particles or pores, or a phosphor material may be provided in a part of the first light guide which is adjacent to the at least part or region of the at least first further surface where the light is out-coupled.

In an embodiment the first light input surface and the first light exit surface extend perpendicular to one another. In an embodiment the first light guide is transparent. In a further embodiment the transparent light guides may comprise a transparent substrate on which the plurality of solid state light sources, for example LEDs, are grown epitaxially. The substrate is in embodiments a single crystal substrate, such as for example a sapphire substrate. The transparent growth substrate of the light sources is in these embodiments the light concentrating light guide.

In an embodiment the light emitting device further comprises a luminescent element arranged at, in or on the at least one first optical element. Thereby a light emitting device is provided with which at least a part of the light coupled out of the first light guide through the at least one first further surface is subjected to a second wavelength conversion, and with which the light output of the light emitting device may be provided with even very complex color distributions.

In an embodiment the light emitting device further comprises a plurality of second solid state light sources adapted for, in operation, emitting third light with a fifth spectral distribution, and a second light guide comprising a second light input surface, a second end surface extending in an angle different from zero with respect to each other and at least one second further surface, the plurality of second solid state light sources being arranged at the second light input surface, the second light guide being adapted for receiving the third light with the fifth spectral distribution at the second light input surface, guiding at least a part of the third light with the fifth spectral distribution to the second end surface and coupling at least a part of the third light with the fifth spectral distribution out of the second end surface, the light emitting device further comprising at least one fourth optical element being adapted for shaping light coupled out of the second light guide through the at least one second further surface such as to provide a third shaped light, and at least one fifth optical element arranged at or on the at least one second end surface.

In an embodiment the at least one fifth optical element is adapted for shaping the third light with the fifth spectral distribution coupled out of the second light guide through the at least one second end surface such as to provide a fourth shaped light.

In an embodiment the at least one first optical element is a first part of a reflector element and the at least one fourth optical element is a second part of the reflector element, the first part and the second part of the reflector element being separated by means of a separation element.

In an embodiment the at least one fourth optical element is adapted for providing at least a part of the third shaped light with a seventh spectral distribution, wherein the at least one fifth optical element is adapted for providing at least a part of the fourth shaped light with an eighth spectral distribution being different from the seventh spectral distribution.

In an embodiment the light emitting device further comprises at least one sixth optical element arranged and adapted for shaping one or more of at least a part of the third shaped light shaped by the fourth optical element and at least a part of the fourth shaped light shaped by the fifth optical element.

The at least one fourth, fifth and sixth optical element may be chosen from the group comprising a reflector, a parabolic reflector, an optical element with total internal reflection, a compound concentrator, a compound parabolic concentrator, a lens, a lens array, a diffractive element and a refractive element.

In an embodiment the second light input surface and the second light exit surface extend perpendicular to one another.

In addition to advantages similar to those mentioned above, the embodiments comprising the second light guide provide for a light emitting device emitting light with an even higher intensity or brightness and being capable of providing a light beam with a desired shape, light distribution and color distribution of a considerably higher complexity in a simple and cost effective manner, particularly as the total light output of a light emitting device according to these embodiments is comprising at least four different light components, namely at least the first, second and third shaped light as well as the light coupled out of the second end surface of the second light guide, whether subsequently shaped or not.

Furthermore, these embodiments provide for further parameters usable for obtaining different geometrical configurations of the light emitting device and/or of the color, size and shape of the beam of light emitted by the light emitting device.

The invention furthermore relates to a lamp, a luminaire, or a lighting system comprising a light emitting device according to any one of the previous claims, the lamp, luminaire and system being used in one or more of the following applications: digital projection, automotive lighting, stage lighting shop lighting, home lighting, accent lighting, spot lighting, theater lighting, fiber optic lighting, display systems, warning lighting systems, medical lighting applications, decorative lighting applications.

It is noted that the invention relates to all possible combinations of features recited in the claims.

BRIEF DESCRIPTION OF THE DRAWINGS

This and other aspects of the present invention will now be described in more detail, with reference to the appended drawings showing embodiment(s) of the invention.

Figure 1:
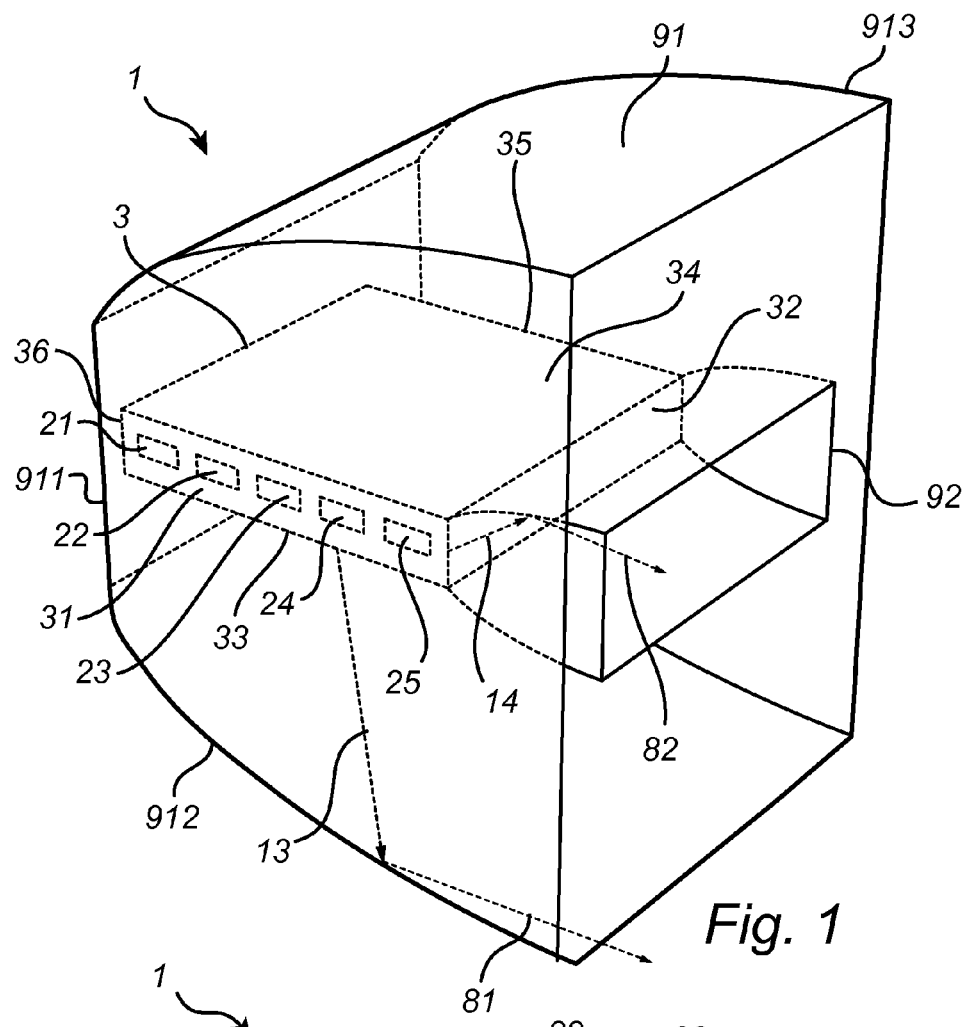
FIG. 1 shows a perspective view of a first embodiment of a light emitting device according to the invention.

As illustrated in the figures, the sizes of layers, elements and regions are exaggerated for illustrative purposes and, thus, are provided to illustrate the general structures of embodiments of the present invention. Like reference numerals refer to like elements throughout, such that e.g. a light emitting device according to the invention is generally denoted 1, whereas different specific embodiments thereof are denoted by adding 01, 02, 03 and so forth to the general reference numeral.

DETAILED DESCRIPTION

The present invention will now be described more fully hereinafter with reference to the accompanying drawings, in which embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

The following description will start with general considerations regarding applications, suitable light sources and suitable materials for various elements and features of a light emitting device according to the invention. For this purpose a number of features and elements may be added to any one of the embodiments of a light emitting device according to the invention as set forth further below.

A light emitting device according to the invention may be used in applications including but not being limited to a lamp, a light module, a luminaire, a spot light, a flash light, a projector, a digital projection device, automotive lighting such as e.g. a headlight or a taillight of a motor vehicle, arena lighting, theater lighting and architectural lighting.

Light sources which are part of the embodiments according to the invention as set forth below, are adapted for, in operation, emitting light with a first spectral distribution. This light is subsequently coupled into a light guide or waveguide. The light guide or waveguide may convert the light of the first spectral distribution to another spectral distribution and guides the light to an exit surface. The light source may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the blue color-range which is defined as a wavelength range of between 380 nm and 495 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light source may be a red light source, i.e. emitting in a wavelength range of e.g. between 600 nm and 800 nm. Such a red light source may be e.g. a light source of any of the above mentioned types directly emitting red light or provided with a phosphor suitable for converting the light source light to red light. This embodiment is particularly advantageous in combination with a light guide adapted for converting the light source light to infrared (IR) light, i.e. light with a wavelength of more than about 800 nm and in a suitable embodiment with a peak intensity in the range from 810 to 850 nm. In an embodiment such a light guide comprises an IR emitting phosphor. A light emitting device with these characteristics is especially advantageous for use in night vision systems, but may also be used in any of the applications mentioned above.

Another example is combination of a first, red light source emitting light in a wavelength range between 480 nm and 800 nm and coupling this light into a luminescent rod or waveguide, and a second light source, emitting blue or UV or violet light, i.e. with a wavelength smaller than 480 nm, and also coupling its emitted light into the luminescent waveguide or rod. The light of the second light source is converted by the luminescent waveguide or rod to a wavelength range between 480 nm and 800 nm, and the light of the first light source coupled into the luminescent waveguide or rod will not be converted. In other words, the second light source emits UV, violet or blue light and is subsequently converted by the luminescent concentrator into light in the green-yellow-orange-red spectral region. In another embodiment the first light source emits in a wavelength range between 500 nm and 600 nm, and the light of the second light source is converted by the luminescent waveguide or rod to a wavelength range between 500 nm and 600 nm. In another embodiment the first light source emits in a wavelength range between 600 nm and 750 nm, and the light of the second light source is converted by the luminescent waveguide or rod to a wavelength range between 600 nm and 750 nm. In an embodiment the light of the first light source is coupled into the luminescent waveguide or rod at another surface, for example a surface opposite to an exit surface of the light, than a surface where the light of the second light source is coupled into the luminescent waveguide or rod. These embodiments provide a luminescent waveguide or rod emitting in the red light range with an increased brightness.

The light guides as set forth below in embodiments according to the invention generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Transparent light guides may in embodiments comprise a transparent substrate on which a plurality of light sources, for example LEDs, are grown epitaxially. The substrate is in embodiments a single crystal substrate, such as for example a sapphire substrate. The transparent growth substrate of the light sources is in these embodiments the light concentrating light guide.

The generally rod shaped or bar shaped light guide can have any cross sectional shape, but in embodiments has a cross section the shape of a square, rectangle, round, oval, triangle, pentagon, or hexagon. Generally the light guides are cuboid, but may be provided with a different shape than a cuboid, with the light input surface having somewhat the shape of a trapezoid. By doing so, the light flux may be even enhanced, which may be advantageous for some applications.

The light guides may also be cylindrically shaped rods. In embodiments the cylindrically shaped rods have one flattened surface along the longitudinal direction of the rod and at which the light sources may be positioned for efficient in-coupling of light emitted by the light sources into the light guide. The flattened surface may also be used for placing heat sinks. The cylindrical light guide may also have two flattened surfaces, for example located opposite to each other or positioned perpendicular to each other. In embodiments the flattened surface extends along a part of the longitudinal direction of the cylindrical rod.

Suitable materials for the light guides as set forth below according to embodiments of the invention are sapphire, polycrystalline alumina and/or undoped transparent garnets such as YAG, LuAG having a refractive index of n=1.7. An additional advantage of this material (above e.g. glass) is that it has a good thermal conductivity, thus diminishing local heating. Other suitable materials include, but are not limited to, glass, quartz and transparent polymers. In other embodiments the light guide material is lead glass. Lead glass is a variety of glass in which lead replaces the calcium content of a typical potash glass and in this way the refractive index can be increased. Ordinary glass has a refractive index of n=1.5, while the addition of lead produces a refractive index ranging up to 1.7.

The light guides as set forth below according to embodiments of the invention may comprise a suitable luminescent material for converting the light to another spectral distribution. Suitable luminescent materials include inorganic phosphors, such as doped YAG, LuAG, organic phosphors, organic fluorescent dyes and quantum dots which are highly suitable for the purposes of embodiments of the present invention as set forth below.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in embodiments of the present invention as set forth below. However, it may be preferred for reasons of environmental safety and concern to use cadmium-free quantum dots or at least quantum dots having very low cadmium content.

Organic fluorescent dyes can be used as well. The molecular structure can be designed such that the spectral peak position can be tuned. Examples of suitable organic fluorescent dyes materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

The luminescent material may also be an inorganic phosphor. Examples of inorganic phosphor materials include, but are not limited to, cerium (Ce) doped YAG ($Y_3Al_5O_{12}$) or LuAG ($Lu_3A_{15}O_{12}$). Ce doped YAG emits yellowish light, whereas Ce doped LuAG emits yellow-greenish light. Examples of other inorganic phosphors materials which emit red light may include, but are not limited to ECAS and BSSN; ECAS being $Ca_{1-x}AlSiN_3:Eu_x$ wherein $0<x\leq1$, in other embodiments $0<x\leq0.2$; and BSSN being $Ba_{2-x-z}M_xSi_{5-y}Al_yN_{8-y}O_y:Eu_z$ wherein M represents Sr or Ca, $0\leq x\leq1$, $0<y\leq4$, and $0.0005\leq z\leq0.05$, and in embodiments $0\leq x\leq0.2$.

In embodiments of the invention as set forth below, the luminescent material is made of material selected from the group comprising $(M<I>_{(1-x-y)}M<II>_x M<III>_y)_3 (M<IV>_{(1-z)} M<V>_z)_5O_{12}$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu or mixtures thereof, M<IV> is Al, M<V> is selected from the group comprising Ga, Sc or mixtures thereof, and $0<x\leq1$, $0<y\leq0.1$, $0<z<1$, $(M<I>_{(1-x-y)} M<II>_x M<III>_y)_2O_3$ where M<I> is selected from the group comprising Y, Lu or mixtures thereof, M<II> is selected from the group comprising Gd, La, Yb or mixtures thereof, M<III> is selected from the group comprising Tb, Pr, Ce, Er, Nd, Eu, Bi, Sb or mixtures thereof, and $0<x\leq1$, $0<y\leq0.1$, $(M<I>_{(1-x-y)} M<II>_x M<III>_y) S_{(1-z)}$ Se where M<I> is selected from the group comprising Ca, Sr, Mg, Ba or mixtures thereof, M<II> is selected from the group comprising Ce, Eu, Mn, Tb, Sm, Pr, Sb, Sn or mixtures thereof, M<III> is selected from the group comprising K, Na, Li, Rb, Zn or mixtures thereof, and $0<x\leq0.01$, $0<y\leq0.05$, $0\leq z<1$, $(M<I>_{(1-x-y)}M<II>_x M<III>_y)O$ where M<I> is selected from the group comprising Ca, Sr, Mg, Ba or mixtures thereof, M<II> is selected from the group comprising Ce, Eu, Mn, Tb, Sm, Pr or mixtures thereof, M<III> is selected from the group comprising K, Na, Li, Rb, Zn or mixtures thereof, and $0<x\leq0.1$, $0<y\leq0.1$, $(M<I>_{(2-x)} M<II>_x M<III>_2)O_7$ where M<I> is selected from the group comprising La, Y, Gd, Lu, Ba, Sr or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and $0<x\leq1$, $(M<I>_{(1-x)} M<II>_x M<III>_{(1-y)} M<IV>_y)O_3$ where M<I> is selected from the group comprising Ba, Sr, Ca, La, Y, Gd, Lu or mixtures thereof, M<II> is selected from the group comprising Eu, Tb, Pr, Ce, Nd, Sm, Tm or mixtures thereof, M<III> is selected from the group comprising Hf, Zr, Ti, Ta, Nb or mixtures thereof, and M<IV> is selected from the group comprising Al, Ga, Sc, Si or mixtures thereof, and $0<x\leq0.1$, $0<y\leq0.1$, or mixtures thereof.

Other suitable luminescent materials are Ce doped Yttrium aluminum garnet (YAG, $Y_3Al_5O_{12}$) and Lutetium-Aluminum-Garnet (LuAG). A luminescent light guide may comprise a central emission wavelength within a blue color-range or within a green color-range or within a red color-range. The blue color-range is defined between 380 nanometer and 495 nanometer, the green color-range is defined between 495 nanometer and 590 nanometer, and the red color-range is defined between 590 nanometer and 800 nanometer.

A selection of phosphors which may be used in embodiments is given in table 1 below along with the maximum emission wavelength.

TABLE 1

| Phosphor | Maximum emission wavelength [nm] |
|---|---|
| $CaGa_2S_4$:Ce | 475 |
| $SrGa_2S_4$:Ce | 450 |
| $BaAl_2S_4$:Eu | 470 |
| $CaF_2$:Eu | 435 |
| $Bi_4Si_3O_{12}$:Ce | 470 |
| $Ca_3Sc_2Si_3O_{12}$:Ce | 490 |

The light guides as set forth below according to embodiments of the invention may comprise regions with a different density of suitable luminescent material for converting the light to another spectral distribution. In an embodiment a transparent light guide comprises two parts adjacent to each other and only one of which comprises a luminescent material and the other part is transparent or has a relatively low concentration of luminescent material. In another embodiment the light guide comprises yet another, third part, adjacent to the second part, which comprises a different luminescent material or a different concentration of the same luminescent material. The different parts may be integrally formed thus forming one piece or one light guide. In an embodiment a partially reflecting element may be arranged between the different parts of the light guide, for example between the first part and the second part. The partially reflecting element is adapted for transmitting light with one specific wavelength or spectral distribution and for reflecting light with another, different, specific wavelength or spectral distribution. The partially reflecting element may thus be a dichroic element such as a dichroic mirror.

In another embodiment (not shown) a plurality of wavelength converting regions of luminescent material is arranged at the light input surface of a transparent light guide above or on top of a plurality of light sources, such as LEDs. Thus the surface area of each of the plurality of wavelength converting regions correspond to the surface area of each of the plurality of light sources such that light from the light sources is coupled into the transparent light guide via the regions of luminescent material. The converted light is then coupled into the transparent part of the light guide and subsequently guided to the light exit surface of the light guide. The wavelength converting regions may be arranged on the light input surface or they may be formed in the light guide. The wavelength converting regions may form part of a homogeneous layer arranged on or in the light guide at the light input surface. Parts of the homogeneous layer extending between two neighboring wavelength converting regions may be transparent and may additionally or alternatively have the same refractive index as the wavelength converting regions. The different wavelength converting regions may comprise mutually different luminescent materials. The distance between the light sources and the luminescent regions may be below 2 mm, below 1 mm or below 0.5 mm.

In embodiments of the light emitting device according to the invention as set forth below a coupling structure or a coupling medium may be provided for efficiently coupling the light emitted by the light sources into the light guide. The coupling structure may be a refractive structure having features, such as e.g. protrusions and recesses forming a wave shaped structure. The typical size of the features of the coupling structure is 5 µm to 500 µm. The shape of the features may be e.g. hemispherical (lenses), prismatic, sinusoidal or random (e.g. sand-blasted). By choosing the appropriate shape, the amount of light coupled into the light guide can be tuned. The refractive structures may be made by mechanical means such as by chiseling, sand blasting or the like. Alternatively, the refractive structures may be made by replication in an appropriate material, such as e.g. polymer or sol-gel material. Alternatively, the coupling structure may be a diffractive structure, where the typical size of the features of the diffractive coupling structure is 0.2 µm to 2 µm. The diffraction angles $\theta_{in}$ inside the light guide are given by the grating equation $\lambda/\Lambda = n_{in} \cdot \sin \theta_{in} - n_{out} \cdot \sin \theta_{out}$, where $\lambda$ is the wavelength of LED light, $\Lambda$ is the grating period, $n_{in}$ and $n_{out}$ are the refractive indices inside and outside the light guide, $\theta_{in}$ and $\theta_{out}$ are the diffraction angle inside and the incident angle outside the light guide, respectively. If we assume the same refractive index $n_{out}=1$ for low-index layer and coupling medium, we find, with the condition for total internal reflection $n_{in} \sin \theta_{in} = n_{out}$, the following condition: $\lambda/\Lambda = 1 - \sin \theta_{out}$, i.e. $\Lambda = \lambda$ for normal incidence $\theta_{out} = 0$. Generally, not all other angles $\theta_{out}$ are diffracted into the light guide. This will happen only if its refractive index $n_{in}$ is high enough. From the grating equation it follows that for the condition $n_{in} \geq 2$ all angles are diffracted if $\Lambda = \lambda$. Also other periods and refractive indices may be used, leading to less light that is diffracted into the light guide. Furthermore, in general a lot of light is transmitted ($0^{th}$ order). The amount of diffracted light depends on the shape and height of the grating structures. By choosing the appropriate parameters, the amount of light coupled into the light guide can be tuned. Such diffractive structures most easily are made by replication from structures that have been made by e.g. e-beam lithography or holography. The replication may be done by a method like soft nano-imprint lithography. The coupling medium may e.g. be air or another suitable material.

Figure 2:
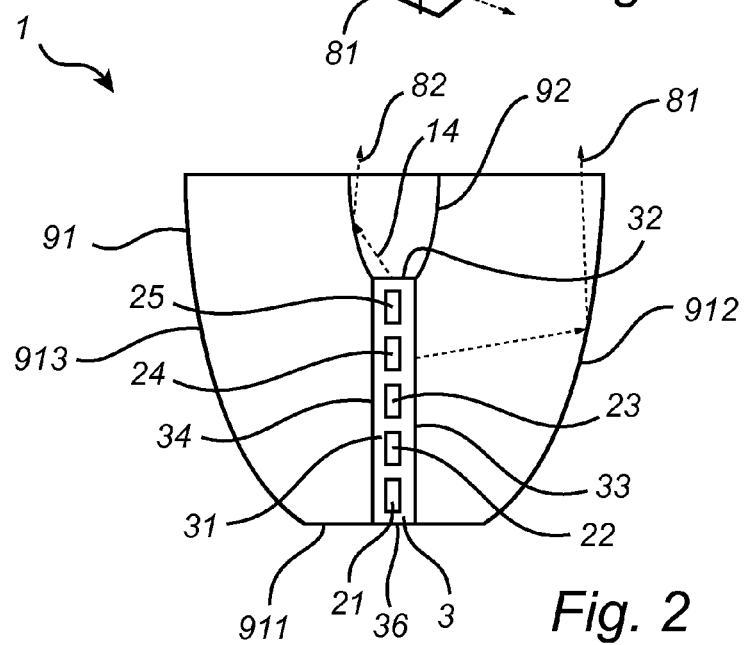
FIG. 2 shows a side view of the light emitting device according to FIG. 1.

FIG. 1 shows a perspective view of a light emitting device 1 according to a first and general embodiment of the invention. FIG. 2 shows a side view of the light emitting device 1. The light emitting device 1 generally comprises a plurality of first light sources 21, 22, 23, 24, 25, a first light guide 3 and at least one first optical element 91.

The light sources described herein are solid state light sources such as LEDs, suitable types of LEDs being described above. In embodiments the first light sources 21, 22, 23, 24, 25 all emit light having the same spectral distribution, but may in alternative embodiments emit light having two or more different spectral distributions. In embodiments, the light sources emit light in the blue wavelength region, but may also emit light in the violet or ultraviolet region.

The first light sources 21, 22, 23, 24, 25 may be arranged on a base or substrate in the form of a heat sink, in embodiments made of a metal such as copper, iron or aluminum. The heat sink may comprise fins for improved heat dissipation. It is noted that in other embodiments the base or substrate need not be a heat sink. By providing a heat sink the heat produced by the light source may be dissipated away from the light guide in an efficient manner. This in turn provides for an increase of the maximum obtainable output light intensity of the light emitting device as well as for decreasing or even eliminating the adverse effects on the optical performance of the light emitting device caused by excess heat in the light guide. The heat sink is, however, not an essential element, and may thus in yet other embodiments be omitted.

As may be seen in the present embodiment, the first light sources are arranged in a row of five first light sources. It is noted that in principle any other number of first light sources may be present, such as e.g. ten, twenty or thirty first light sources.

The first light guide 3 is shown shaped generally as a square plate having a first light input surface 31 and a first light exit surface 32 extending in an angle different from zero to each other such that the first light exit surface 32 is a first end surface of the first light guide 3. The first light guide 3 further comprises first further surfaces 33, 34, 35, 36 of which the surface 36 is extending opposite and parallel to the first light exit surface 32. In embodiments the surface that is opposite and parallel to the first light exit surface 32 may be provided with a reflector or reflecting layer. The first light guide 3 may also be bar or rod shaped or shaped e.g. as a rectangular plate. The first light sources 21, 22, 23, 24, 25 are arranged adjacent to and in optical contact with the first light input surface 31 of the first light guide 3. In an embodiment the plurality of solid state light sources are also arranged adjacent to and in optical contact with the first further surface 36 that is extending opposite and parallel to the first light exit surface 32, wherein this first further surface 36 also functions as a light input surface.

Alternative configurations of the light emitting device according to the invention are also feasible in which the first light exit surface 32 and the further surface 36 are mutually opposite side surfaces and the first light input surface 31 is an end surface.

Alternative configurations of the light emitting device according to the invention are also feasible in which the first light exit surface 32 and the first light input surface 31 are mutually parallel and opposite surfaces.

Furthermore, the first light guide 3 may comprise a transparent material, a luminescent material, a garnet, a light concentrating material or a combination thereof, suitable materials and garnets being described above. The first light guide 3 guides light substantially in a longitudinal direction to the first end surface, mainly in a direction parallel to the first further surfaces.

In an embodiment the first light guide 3 is a light guide for guiding light to an exit surface and adapted for or capable of converting light with one spectral distribution to light with a different spectral distribution. Thus, in an embodiment the first light guide 3 is a transparent light guide and comprising a material adapted for converting light with a spectral distribution to light with another spectral distribution. This material adapted for converting light with a spectral distribution to light with another spectral distribution may be arranged at a surface of the first light guide 3, but it is in an embodiment embedded in the first light guide 3.

In an alternative embodiment the first light guide 3 is a transparent light guide that guides the light emitted by the solid state light sources to an exit surface, and wherein the first light guide 3 does not convert light to light with another spectral distribution. For example the transparent light guide may comprise a transparent substrate on which the solid state light sources are grown epitaxially. The substrate is in embodiments a single crystal substrate, such as for example a sapphire substrate. The transparent growth substrate of the light sources is thus in these embodiments the light concentrating transparent light guide.

The light emitting device 1 furthermore comprises a first optical element 91 for shaping light coupled out of the first light guide 3 through the first further surfaces 33, 34, 35 and 36, which light would otherwise (in case no first optical element was present) be lost. The first optical element 91 is in this example arranged adjacent to, at or on the at least one first further surface. In other words the first light guide 3 is in this example arranged in the first optical element 91. The first light guide 3 may, but need not necessarily, be arranged at the center of the first optical element 91. It is noted that in the embodiment shown in FIG. 1 most light that is otherwise lost is coupled out through only two of the first further surfaces, namely first further surfaces 33 and 34 of the first light guide 3. Thus, in this and similar embodiments the first optical element 91 need not necessarily be adapted to shape light coupled out of all of the first further surfaces of the first light guide 3.

The first optical element 91 may, by means of non-limiting examples, be a reflector, a parabolic reflector, an optical element with total internal reflection, a compound concentrator, a compound parabolic concentrator, a lens, a lens array, refractive element, diffractive element and any combination of such elements.

In alternative embodiments the first optical element may be provided as a compound optical element, and/or the first optical element may possibly only be provided adjacent to, at or on some, and thus not all, of the first further surfaces. In such embodiments it is furthermore feasible that the first optical element may be a compound optical element comprising different types of optical elements e.g. such that each or some of the first further surfaces may be provided with different types of optical elements. In yet other embodiments the first optical element may also have more than one—e.g. two, three or four—optical chambers, e.g. such that each first further surface of the first light guide may be assigned one separate optical chamber of the first optical element.

In the embodiments shown, however, the first optical element 91 is a reflector comprising an end surface 911 and two parabolic side surfaces 912, 913 as well as two flat side surfaces extending between the parabolic side surfaces 912, 913. A suitable alternative is a rotational symmetric parabolic reflector.

The first further surface 36 of the first light guide 3 extending opposite and parallel to the first light exit surface 32 is in an embodiment arranged adjacent to the end surface 911 of the first optical element 91. The end surface 911 of the first optical element 91 acts in this embodiment as a reflector reflecting light which escapes through this first further surface 36 back into the first light guide 3. The parabolic side surfaces 912, 913 shape the light coupled out of the first light guide 3 through the first further surfaces 33, 34 and 35 to form first shaped light 81 and directs the first shaped light 81 out of the light emitting device 1 in a direction substantially corresponding to the direction in which the light coupled out of the first light exit surface 32 is emitted.

The light emitting device 1 furthermore comprises in this embodiment a second optical element 92 for shaping light coupled out of the first light guide 3 through the first light exit surface 32. The second optical element 92 may by means of non-limiting examples be a reflector, a parabolic reflector, an optical element with total internal reflection, a compound concentrator, a compound parabolic concentrator, a lens, a lens array, a diffractive element, a refractive element and any combination thereof. The second optical element 92 may, but need not necessarily, be the same type of optical element as the first optical element 91.

In the embodiment shown in FIGS. 1 and 2, the second optical element 92 is a reflector comprising an end surface, through which light exits, two parabolic side surfaces and two flat side surfaces extending between the parabolic side surfaces. A suitable alternative is a rotational symmetric parabolic reflector. The second optical element 92 is arranged adjacent to and extending from the first light exit surface 32 such as to shape the light coupled out of the first light guide 3 through the first light exit surface 32 thus forming second shaped light 82.

With reference to FIGS. 1 and 2 a light emitting device according to an embodiment of the invention generally works as follows. First light 13 having a first spectral distribution is emitted by each light source of the first light sources 21, 22, 23, 24, 25. The first light 13 having the first spectral distribution is then coupled into the first light guide 3 at the first light input surface 31. At least a part of the first light 13 with the first spectral distribution is converted by the light guide 3 to second light 14 having a second spectral distribution. Light, which primarily consists of the second light having the second spectral distribution and which is thus denoted with reference numeral 14 in the Figures, is coupled out of the first light guide 3 at the first light exit surface 32. Simultaneously, light, which primarily consists of the first light having the first spectral distribution and which is thus denoted with reference numeral 13 on the Figures, is coupled out of the first light guide 3 via at least one of the first further surfaces 33, 34, 35 and 36.

In an alternative embodiment the light guide is transparent and the light guide thus does not convert the light to another spectral distribution. In this embodiment a part of the light is coupled out of the first light guide 3 via the first light exit surface 32 and a part of the light is coupled out of first light guide 3 via the at least one of the first further surfaces 33, 34, 35 and 36. The light 13 coupled out of at least one of the first further surfaces 33, 34, 35 and 36 is shaped by the first optical element 91 such that first shaped light 81 is provided. Simultaneously, the second light 14 coupled out of the first light exit surface 32 is shaped by the at least one second optical element 92 such that second shaped light 82 is provided. The first shaped light 81 and the second shaped light 82 are emitted by the light emitting device 1 thereby forming a combined light beam, which comprises a combination of different light shapes, light distributions and spectral distributions. The different light shapes, light distributions and spectral distributions forming the emitted light beam are dependent on the properties of the first light guide 3 and the first and second optical element 91 and 92.

Figure 3:
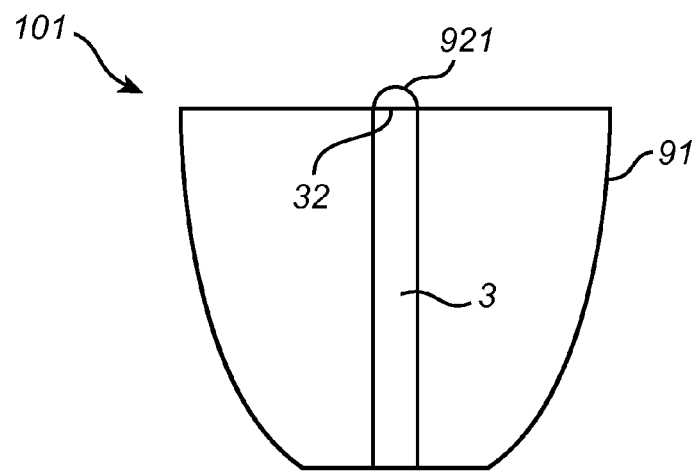
FIGS. 3-5 show side views of a further three different embodiments of a light emitting device according to the invention featuring different optical elements.
Figure 4:
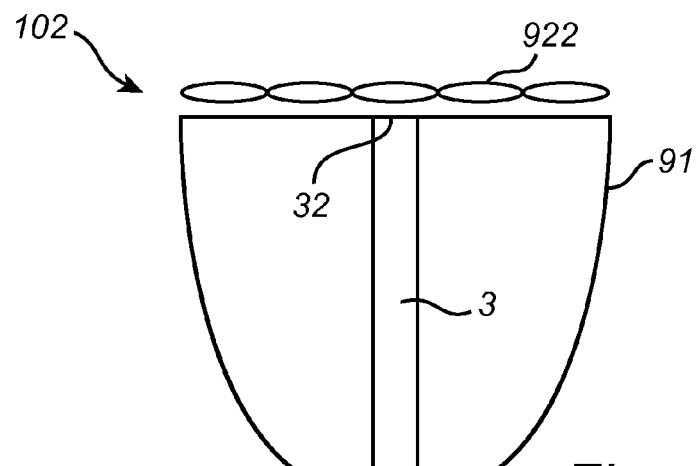
Figure 5:
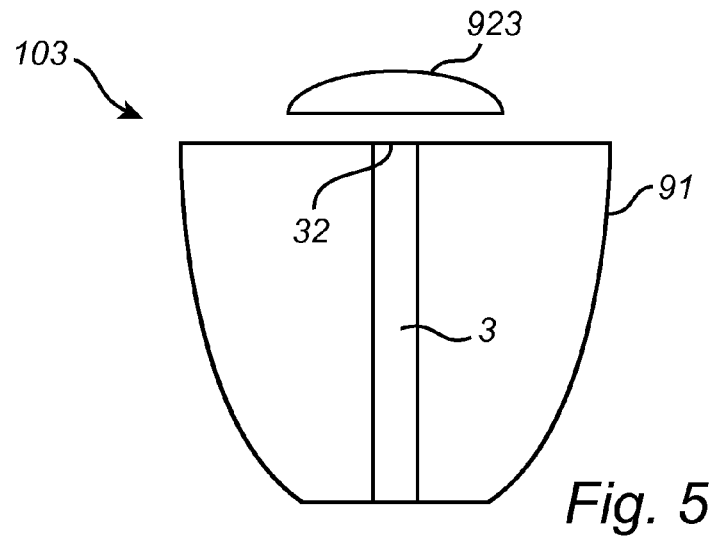

Turning now to FIGS. 3 to 5 three further different embodiments of a light emitting device according to the invention illustrating different examples of second optical elements for shaping light coupled out of the first light exit surface 32 of the first light guide 3 are shown.

The light emitting device 101 shown in FIG. 3 comprises a second optical element 921 in the form of a lens provided on the first light exit surface 32 of the first light guide 3.

The light emitting device 102 shown in FIG. 4 comprises a second optical element 922 in the form of an array of lenses provided adjacent the first light exit surface 32 of the first light guide 3 and extending to either side of the first light exit surface 32 such as to also be arranged in front of the first optical element 91. Thereby, a second optical element 922 is provided which is furthermore adapted for shaping all of the first shaped light 81 shaped by the first optical element 91. This effect may in an alternative be obtained with one single lens of a suitable size.

The light emitting device 103 shown in FIG. 5 comprises a second optical element 923 in the form of a lens provided adjacent the first light exit surface 32 of the first light guide 3 and extending to either side of the first light exit surface 32 such as to also be arranged partially in front of the first optical element 91. Thereby, a second optical element 923 is provided which is furthermore adapted for shaping a part of the first shaped light 81 shaped by the first optical element 91. This effect may in an alternative be obtained with a suitably sized array of lenses.

As shown on FIGS. 3 to 5 the optical elements, being lenses or arrays of lenses, are shown as convex lenses. However, they may just as well be concave lenses or, particularly in case of an array of lenses, a mix of convex and concave lenses.

Figure 6:
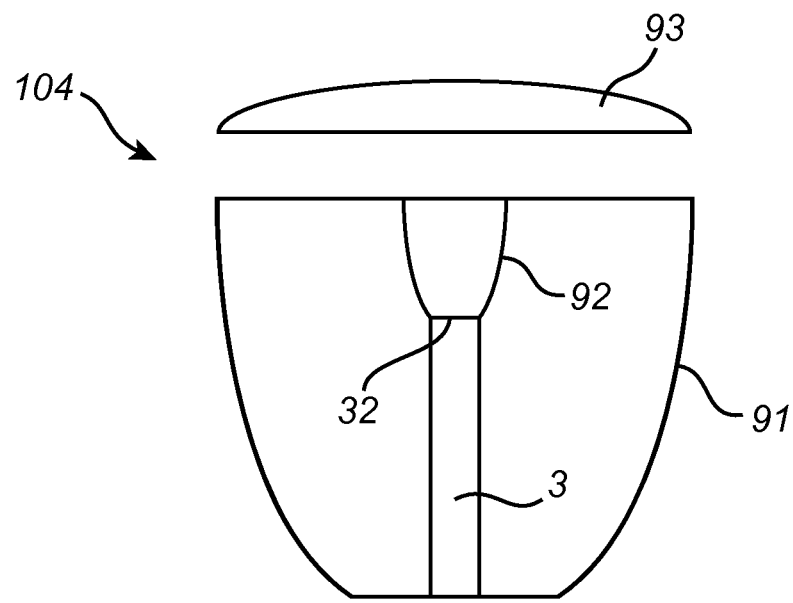
FIG. 6 shows a side view of a fifth embodiment of a light emitting device according to the invention.

Turning now to FIG. 6, a side view of another embodiment of a light emitting device 104 according to the invention is shown. The light emitting device 104 differs from that shown in FIG. 1 and described above in that it further comprises a third optical element 93 arranged in front of the first and second optical elements 91 and 92 such as to further shape at least a part of the first shaped light 81 shaped by the first optical element 91 and at least a part of the second shaped light 82 shaped by the second optical element 92.

The third optical element 93 may, by means of non-limiting examples, be a reflector, a parabolic reflector, a total internal reflector, a compound concentrator, a compound parabolic concentrator, a lens and a lens array. The third optical element 93 may, but need not necessarily, be the same type of optical element as the first optical element 91 and/or the second optical element 92.

In alternative embodiments the third optical element 93 may be arranged and/or be provided with such dimensions that it is provided for shaping at least a part of the first shaped light 81 shaped by the first optical element 91 or at least a part of the second shaped light 82 shaped by the second optical element 92, only.

Figure 7:
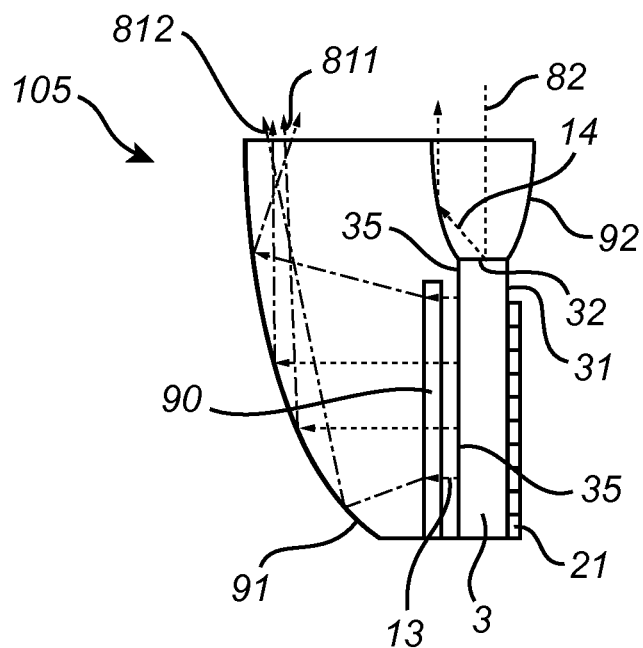
FIG. 7 shows a side view of a sixth embodiment of a light emitting device according to the invention.

Turning now to FIG. 7, a side view of another embodiment of a light emitting device 105 according to the invention is shown. The light emitting device 105 differs from that shown in FIG. 1 and described above in that it further comprises a luminescent element 90 arranged in between the first optical element 91 and the first light guide 3. The luminescent element 90 may comprise one or more luminescent materials, such as phosphors, which may be arranged in a layered or patterned structure. Suitable luminescent materials are described above.

The luminescent element 90 is generally arranged adjacent to at least one of the first further surfaces 33, 34, 35 and 36, in the embodiment shown in FIG. 7 exemplified by the first further surface 35. The luminescent element 90 converts part of the light 13 coupled out of the first light guide 3 through at least one of the first further surfaces 33, 34, 35 and 36 to light with a different spectral distribution, in this embodiment only light 13 is converted that is coupled out of the first light guide 3 through only one of the first further surfaces. Thereby the first shaped light shaped by and emitted from the first optical element 91 consists of light 811 and 812, respectively, with two different spectral distributions.

Thus, in the embodiment shown in FIG. 7, the first optical element 91 is adapted for providing the first shaped light 811, 812 with a third spectral distribution, which is here a combination of the respective spectral distributions of the light 811 and 812, and the second optical element 92 is adapted for providing the second shaped light 82 with a fourth spectral distribution being different from the third spectral distribution of the first shaped light 811, 812.

In an alternative embodiment, the luminescent element 90 may be provided e.g. as a luminescent layer or coating provided on the inner surface of the first optical element 91 and/or on one or more of the first further surfaces 33, 34, 35 and 36 and/or on the first light sources 21. The luminescent element 90 may alternatively also be any other kind of wavelength converting element. Alternatively or in addition thereto each first further surface 33, 34, 35, 36 of the first light guide may be assigned a separate luminescent element.

Figure 8:
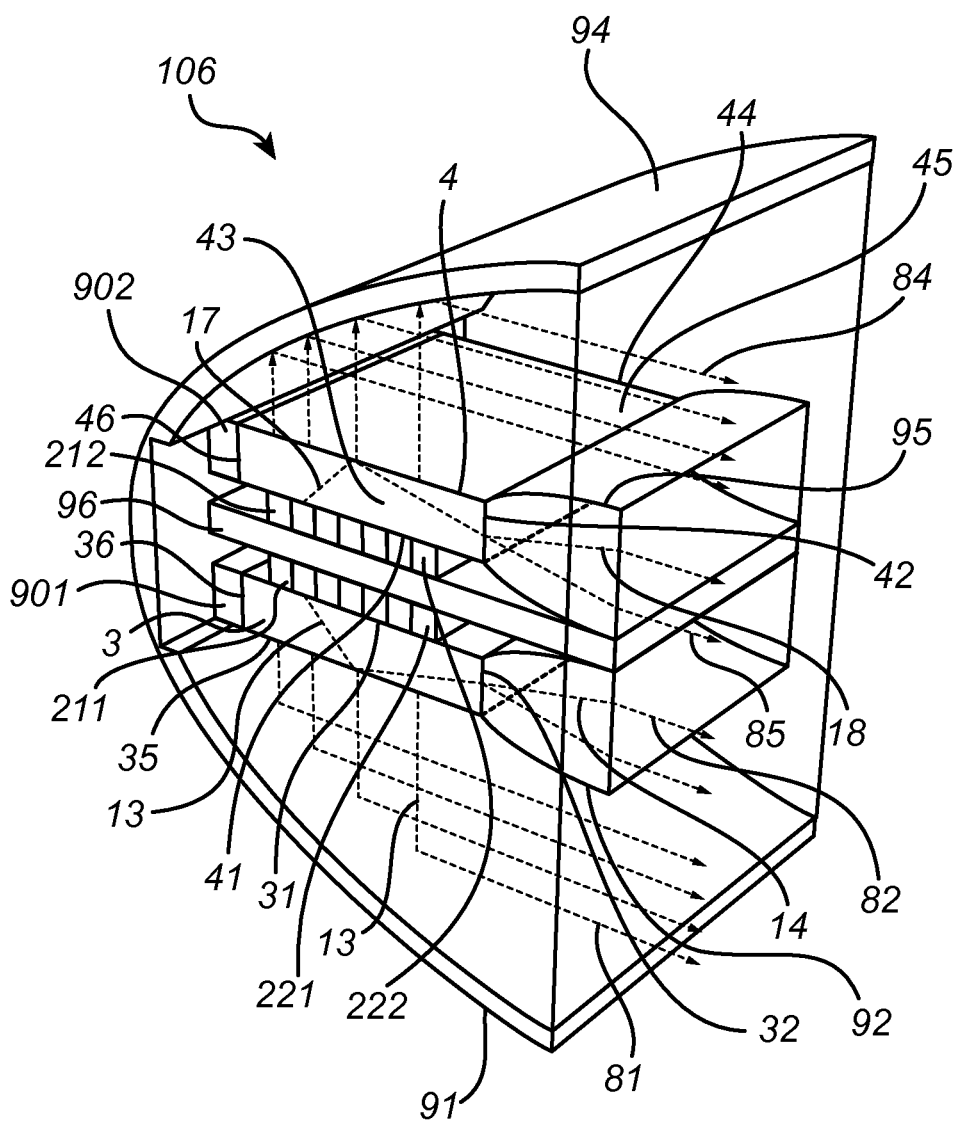
FIG. 8 shows a perspective view of a seventh embodiment of a light emitting device according to the invention.
Figure 9:
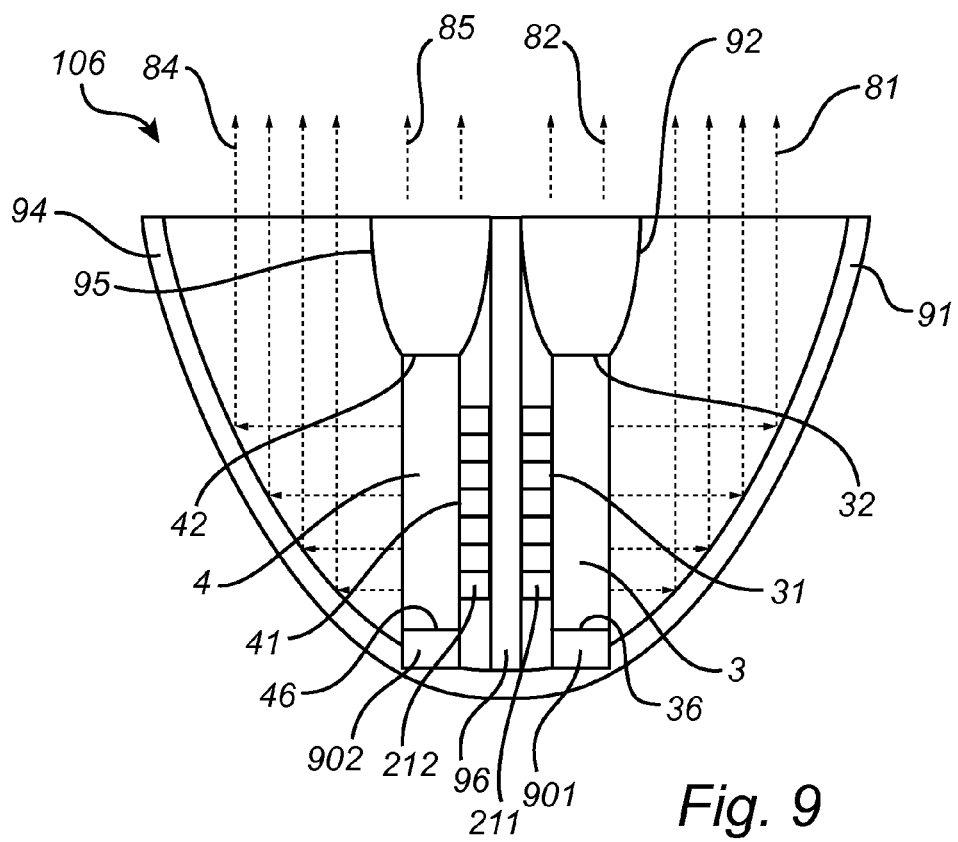
FIG. 9 shows a side view of the light emitting device according to FIG. 8.

FIG. 8 shows a perspective view of a light emitting device 106 according to another embodiment of the invention and FIG. 9 shows a side view of the light emitting device 106.

The light emitting device 106 comprises first light sources 211, 221, a first light guide 3, a first optical element 91 and a second optical element 92 according to any of the embodiments described above.

The light emitting device 106 further comprises second solid state light sources 212, 222, a second light guide 4, a fourth optical element 94 and a fifth optical element 95.

The fourth optical element 94 and the fifth optical element 95 may, by means of non-limiting examples, be a reflector, a parabolic reflector, an optical element with total internal reflection, a compound concentrator, a compound parabolic concentrator, a lens, a lens array and any combination thereof. The fourth optical element 94 and the fifth optical element 95 may, but need not necessarily, be identical. Furthermore, the fourth optical element 94 and the fifth optical element 95 may, but need not necessarily, be of the same type of optical element as the first optical element 91 and/or the second optical element 92.

The second light guide 4 is shown shaped generally as a square plate having a second light input surface 41 and a second light exit surface 42 extending at an angle different from zero with respect to each other such that the second light exit surface 42 is a second end surface of the second light guide 4. The second light guide 4 further comprises second further surfaces 44, 44, 45, 46 of which in this example the one of the second further surfaces, i.e. surface 46, is extending parallel to and opposite the second light exit surface 42, this surface 46 thus likewise being an end surface of the second light guide 4. The second light guide 4 may also be bar or rod shaped or shaped e.g. as a rectangular plate. The second light sources 212, 222 are arranged adjacent to and in optical contact with the second light input surface 41 of the second light guide 4.

The first light guide 3 and the second light guide 4 are arranged in such a way with respect to each other that the first light input surface 31 and the second light input surface 41 face each other.

Alternative configurations of the light emitting device 106 according to FIGS. 8 and 9 in which the second light exit surface 42 and the surface 46 are mutually opposite side surfaces and the second light input surface 41 is an end surface are also feasible.

Other alternative configurations of the light emitting device 106 according to FIGS. 8 and 9, in which the second light exit surface 42 and the second light input surface 41 are mutually opposite and parallel surfaces, are also feasible.

Furthermore, the second light guide 4 may comprise a transparent material, a luminescent material, a garnet, a light concentrating material or a combination thereof, being different from or the same as the material of the first light guide 3. Suitable materials and garnets are described above.

In an embodiment the second light guide 4 is a transparent light guide comprising a material adapted for converting light with one spectral distribution to light with another spectral distribution. The material adapted for converting light with one spectral distribution to light with another spectral distribution may be arranged at a surface of the second light guide 4, and in an embodiment it is embedded in the second light guide 4, and the material may be different from or the same as the material of the first light guide 3. In an alternative embodiment the second light guide 4 is a transparent light guide for guiding the light emitted by the solid state light sources. For example the transparent light guide may comprise a transparent substrate on which the solid state light sources are grown epitaxially. The substrate is in embodiments a single crystal substrate, such as for example a sapphire substrate. The transparent growth substrate of the light sources is thus in these embodiments the light concentrating transparent light guide.

In the embodiment shown in FIGS. 8 and 9 the first optical element 91 is a first part of a reflector element and the fourth optical element 94 is a second part of the reflector element, the first part and the second part of the reflector element being separated by means of a separation element 96. The separation element 96 may serve as a common base for the first light sources 211 and 221 and the second light sources 212 and 222 and/or it may itself form part of the first optical element 91 and/or the fourth optical element 94. In an embodiment, the separation element 96 is a reflective element or an element provided with a reflective coating or surface layer. Alternatively or in addition thereto the separation element 96 may have heat dissipating properties such as to function as a heat sink element.

Each of the first light guide 3 and the second light guide 4 comprises a luminescent element 901 and 902, respectively. The luminescent element 901 is generally arranged adjacent to at least one of the first further surfaces 33, 34, 35 and 36 and the luminescent element 902 is generally arranged adjacent to at least one of the second further surfaces 43, 44, 45 and 46.

In the embodiment shown in FIG. 8 the luminescent element 901 is arranged adjacent to the first further surface 36 that is extending parallel and opposite to the first light exit surface 32 and the luminescent element 902 is arranged adjacent to the second further surface 46 that is extending parallel and opposite to the second light exit surface 42. The luminescent elements 901 and 902 convert part of the light coupled out of the first light guide 3 and second light guide 4, respectively, through the first and second further surfaces 36 and 46, respectively, to light with a different spectral distribution, most of which light is thereupon reflected back into the respective light guide 3, 4 and eventually emitted through at least the respective light exit surface 32, 42. Thereby the first shaped light 81, shaped by and emitted from the first optical element 91, and the third shaped light 84, shaped by and emitted from the fourth optical element 94, comprises light with a total of four different spectral distributions.

In alternative embodiments the luminescent elements 901, 902 may be substituted for or may additionally comprise reflective elements for reflecting light back towards the respective light exit surface 32, 42.

Thus, in the embodiment shown in FIG. 8, the first shaped light 81 provided by means of the first optical element 91, the second shaped light 82 provided by means of the second optical element 92, the third shaped light 84 provided by means of the fourth optical element 94 and the fourth shaped light 85 provided by means of the fifth optical element 95 may be provided with mutually different spectral distributions. Alternatively, two or more of the first, second, third and fourth shaped light 81, 82, 83 and 84 may be provided with identical or similar or overlapping spectral distributions.

Alternatively a light emitting device of the type shown in FIGS. 8 and 9 may comprise two different or identical light emitting devices according to any of the embodiments described above in relation to FIGS. 1-7. Also, light emitting devices comprising three or more light emitting devices according to any of the embodiments described above in relation to FIGS. 1-7 are likewise feasible.

A light emitting device 106 according to FIGS. 8 and 9 generally works as follows. First light 13 having a first spectral distribution is emitted by the first light sources 211, 221. The first light 13 having the first spectral distribution is then coupled into the first light guide 3 at the first light input surface 31. A part of the first light 13 with the first spectral distribution is converted by the first light guide 3 to second light 14 having a second spectral distribution. Another part of the first light 13 with the first spectral distribution is coupled out of the first light guide 3 through at least one of the first further surfaces 33, 34, 35 and 36 and is shaped by the first optical element 91 such as to provide first shaped light 81, which is emitted by the light emitting device 106. The second light 14 having the second spectral distribution is coupled out of the first light guide 3 at the first light exit surface 32, and is shaped by the second optical element 92 to form second shaped light 82, which is emitted by the light emitting device 106. Simultaneously, third light 17 having a fifth spectral distribution is emitted by the second light sources 212, 222. The third light 17 having the fifth spectral distribution is then coupled into the second light guide 4 at the second light input surface 41. A part of the third light 17 with the fifth spectral distribution is converted by the second light guide 4 to fourth light 18 having a sixth spectral distribution. Another part of the third light 17 with the fifth spectral distribution is coupled out of the second light guide 4 through at least one of the second further surfaces 43, 44, 45 and 46 and is shaped by the fourth optical element 94 such as to provide third shaped light 84, which is emitted by the light emitting device 106. The fourth light 18 having the sixth spectral distribution is coupled out of the second light guide 4 at the second light exit surface 42, and is shaped by the fifth optical element 95 to form fourth shaped light 85, which is emitted by the light emitting device 106. Thus in this embodiment the light emitting device 106 emits light comprising the first shaped light 81, the second shaped light 82, the third shaped light 83 and the fourth shaped light 85.

In an additional embodiment similar to the light emitting device 104 shown in FIG. 6, a light emitting device according to FIGS. 8 and 9 may also comprise a sixth optical element arranged in front of the fourth and/or fifth optical element 94, 95 such as to further shape the third shaped light 84 and/or the fourth shaped light 85.

Also, irrespective of the embodiment, the combined light output of a light emitting device according to embodiments the invention may be provided such that the respective first, second, third and fourth shaped light, as the case may be, is overlapping partly or completely and/or such that the first and/or third shaped light is used primarily or exclusively for background illumination.

Figure 10:
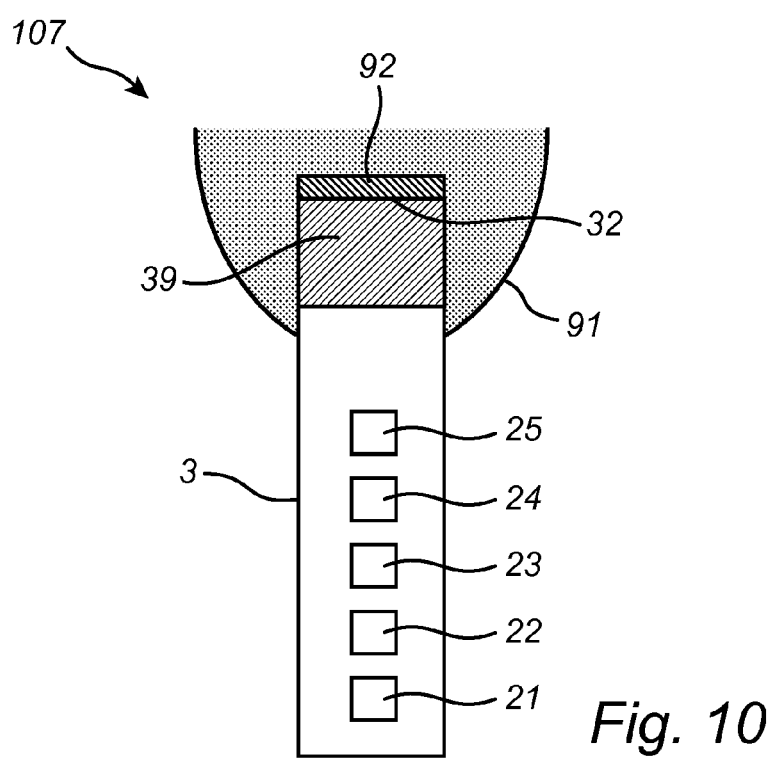
FIG. 10 shows a schematic cross-section of an embodiment of a light emitting device according to the invention.

FIG. 10 shows a schematic cross-section of an embodiment of a light emitting device 107 according to the invention in which the second optical element 92 is a reflector. Furthermore, in this embodiment the first light guide 3 comprises an out-coupling region 39 where at least a part of the light that is coupled in into the first light guide 3 from the solid state light sources 21, 22, 23, 24, 25 is coupled out of the first light guide 3. The reflector is arranged at the first end surface 32 of the first light guide 3 such that light that arrives at the first end surface 32 is reflected back in the light guide 3 and, hence, the first end surface 32 is not a light exit surface in this embodiment. In this way a predetermined area or region of the first light guide 3 is provided where the light is coupled out from at least one of the first further surfaces. In this embodiment the first light guide 3 is not entirely within the first optical element 39. Instead, only the out-coupling region 39 is surrounded by the first optical element 91 such that the light that is coupled out from the out-coupling region 39 of first light guide 3 is shaped by the first optical element such as to provide a first shaped light. In this embodiment the first optical element 91 is a parabolic reflector which shapes and redirects the light coupled out of at least one first further surface into the main longitudinal direction of the first light guide 3. In other words, the first light guide 3, which guides the light along a longitudinal direction to the first end surface, is in this embodiment a side-emitting light guide, emitting, or coupling out, the light at a predefined region of at least one further surface of the first light guide 3. This provides for a high brightness light emitting device where glare is avoided.

In an embodiment the out-coupling region 39 comprises scattering particles or pores, or phosphor particles converting the light also to another spectral distribution. In an embodiment the out-coupling region 39 comprises a roughened surface, a scattering layer, a phosphor layer, a refractive layer or a diffractive layer. This roughened surface or additional layer is provided on at least one of the first further surfaces.

The reflector 92 may be, for example, a diffusive reflector. The reflector 92 may also be larger than the first end surface 32. In an embodiment the reflector 92 has a shape such that side emission is enhanced, for example an arc shape.

In an embodiment a reflector is arranged at the surface opposite to the first end surface 32.

Further additional features, which may be added irrespective of the embodiment include the following.

The light sources may be tuned such that different dynamic beam shapes can be obtained. A lighting system may comprise a light emitting device according to invention and a controller which is adapted to selectively switch each of the plurality of light sources 21, 22, 23, 24, 25 on and off. By way of example, referring to the embodiment shown in FIG. 1, light sources 21, 22 and 23 are switched on and light sources 24 and 25 are switched off which results in a different beam shape than the other way around i.e. LEDs 21, 22 and 23 are switched off and 24 and 25 are switched on. The beam shape obtained with the second optical element 92 would be the same, but the collimation of the light with the first optical element 91 is in this example different because the distance between the first optical element 91 and the light sources that are switched on differs with respect to the distance between the first optical element 91 and the light sources that are switched off.

The space between the first optical element and, where present, the third optical element, and the light sources may be filled with a material such as a suitable polymer or liquid instead of with air as in the above described embodiments.

Furthermore a heat sink element or an active cooling element such as a cooling fan may be provided, the cooling element being directed to the light guide. The use of an active cooling element allows for omitting or minimizing the heat sink element or other heat sinking of the light guide and for improved light extraction and/or collimation.

EXAMPLE

Figure 11:
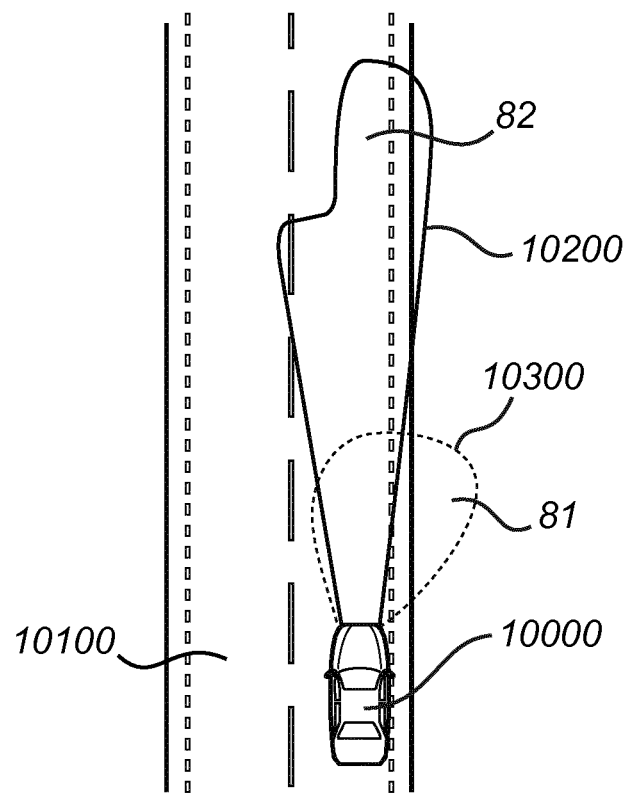
FIG. 11 shows an illustration of an application of a light emitting device according to the invention in an automotive headlight.

Referring now to FIG. 11, an example of an application of a light emitting device according to an embodiment of the invention in an adaptive automotive headlight system will be described. FIG. 11 shows a vehicle 10000 illuminating a road 10100. As shown in FIG. 11, the headlight of the vehicle 10000 is arranged to illuminate the road 10100 in a highway light beam pattern 10200. The highway light beam pattern 10200 is in embodiments used when traveling in the vehicle 10000 along the road 10100, which for example is a highway, at a relatively high speed. In this case, the optical axis of the light emitted from the headlight system of the vehicle 10000 is essentially parallel to the road 10100. The highway light beam pattern 10200 is formed by the second shaped light 82 emitted by a light emitting device according to the invention.

As a light emitting device according to the invention also emits first shaped light 81 as described above, it is possible to obtain a second light beam pattern by means of the first shaped light 81 simultaneously with the first light beam pattern formed by the second shaped light 82.

Such a second light beam pattern may be formed according to need and circumstances. E.g., when moving into a cross country environment, it is preferred to tilt the optical axis of the headlight of the vehicle 10000 downwards towards the road 10100, thereby obtaining a cross country light beam pattern 10300, which as shown in FIG. 11 is formed by the first shaped light 81 emitted by a light emitting device according to the invention. The cross country light beam pattern 10300 will prevent dazzling of oncoming vehicles and is used when traveling at a medium speed. In this case the tilt of the optical axis of the headlight may e.g. be obtained by using a light emitting device 104 according to the embodiment shown in FIG. 6, in which the third optical element 93 is a suitable lens providing the tilt.

Alternatively, the second light beam pattern may be adapted for town lighting conditions (not shown), in which the optical axis of the headlight of the vehicle 10000 would be tilted further downwards, and the emitted light would thereby be broadened. Such a town light beam pattern is used when traveling at a relatively low speed. The town light beam pattern will increase the illumination of the shoulders of the road 10100, increasing traffic safety in relation to, for example, pedestrians and cyclists moving on the side of the road 10100.

Obviously, a light emitting device according to the invention used in an automotive lighting application may also be adapted for providing other combinations of beam patterns and/or to provide all three above-mentioned beam patterns simultaneously and/or to adjust the color distribution of the beam patterns according to need. Furthermore, it is feasible to provide a light emitting device according to an embodiment of the invention used in an automotive lighting application with a controller adapted to selectively switch on and/or off one or more of such light beam patterns.

As is clear from the above, in applications such as automotive lighting a complicated light distribution is needed. For example, for comfort and safety reasons in the straight forward direction of a vehicle the light is white for good visibility, to the left (or right) more yellow to avoid the blinding of the drivers and to the right (or left) more blue in order to improve the visibility of the road marks. Thus, in such embodiments a control device is adapted for controlling the color of the light emitted by the light emitting device as a function of the direction of emission. The person skilled in the art realizes that the present invention is by no means limited to the embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A light emitting device comprising:
   a plurality of first solid state light sources adapted for, in operation, emitting first light with a first spectral distribution, and
   a first light guide comprising a first light input surface, a first end surface extending in an angle different from zero with respect to each other and at least one first further surface, the plurality of first solid state light sources being arranged at the first light input surface,
   the first light guide being adapted for receiving the first light with the first spectral distribution at the first light input surface, and guiding at least a part of the first light with the first spectral distribution to the first end surface,
   the light emitting device further comprising at least one first optical element, which is adapted for shaping light that is coupled out of the first light guide through at least a part of the at least one first further surface such as to provide a first shaped light, and at least one second optical element arranged at or on the first end surface.

2. A light emitting device according to claim 1, wherein the first light guide is adapted to couple at least a part of the first light with the first spectral distribution out of the first end surface and wherein the at least one second optical element is adapted for shaping light that is coupled out of the first light guide through the first end surface such as to provide a second shaped light.

3. A light emitting device according to claim 1, wherein the second optical element furthermore is adapted for shaping at least a part of the first shaped light.

4. A light emitting device according to claim 1, wherein the first optical element is adapted for converting at least a part of the first shaped light to light with a third spectral distribution and wherein the at least one second optical element is adapted for converting at least a part of the second shaped light to light with a fourth spectral distribution being different from the third spectral distribution.

5. A light emitting device according to claim 1, wherein the at least one second optical element is a reflector and wherein the first light guide is adapted to couple at least a part of the first light with the first spectral distribution out of at least a part of the at least one first further surface.

6. A light emitting device according to claim 5, wherein light out-coupling means are provided on the at least part of the at least one first further surface of the first light guide.

7. A light emitting device according to claim 5, wherein light out-coupling means are provided in a part of the first light guide.

8. A light emitting device according to claim 1, wherein the first light guide is transparent.

9. A light emitting device according to claim 1, further comprising a luminescent element arranged at, in or on the at least one first optical element.

10. A light emitting device according to claim 1, further comprising:
    a plurality of second solid state light sources adapted for, in operation, emitting third light with a fifth spectral distribution, and
    a second light guide comprising a second light input surface, a second end surface extending in an angle different from zero with respect to each other and at least one second further surface, the plurality of second solid state light sources being arranged at the second light input surface,
    the second light guide being adapted for receiving the third light with the fifth spectral distribution at the second light input surface, guiding at least a part of the third light with the fifth spectral distribution to the second end surface and coupling at least a part of the third light with the fifth spectral distribution out of the second end surface,
    at least one fourth optical element which is adapted for shaping light coupled out of the second light guide through at least a part of the at least one second further surface such as to provide a third shaped light, and
    at least one fifth optical element arranged at or on the at least one second end surface.

11. A light emitting device according to claim 10, wherein the at least one fifth optical element is adapted for shaping the third light with the fifth spectral distribution that is coupled out of the second light guide through the at least one second end surface such as to provide a fourth shaped light.

12. A light emitting device according to claim 1, wherein the at least one first optical element is a first part of a reflector element and the at least one fourth optical element is a second part of the reflector element, the first part and the second part of the reflector element being separated by means of a separation element.

13. A light emitting device according to claim 1, wherein the second light guide is adapted for converting at least a part of the third light with the fifth spectral distribution to fourth light with a sixth spectral distribution, guiding at least a part of the fourth light with the sixth spectral distribution to the second end surface and coupling at least a part of the fourth light with the sixth spectral distribution out of the second end surface.

14. A light emitting device according to claim 1, wherein the first light guide is adapted for converting at least a part of the first light with the first spectral distribution to second light with a second spectral distribution, and guiding the second light with the second spectral distribution to the first end surface.

* * * * *